April 3, 1928.
J. MICALI
1,665,172
SHANK FORMING TOOL
Filed April 29, 1924
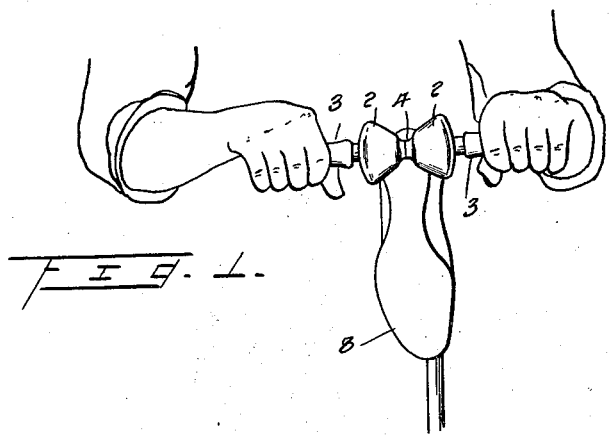
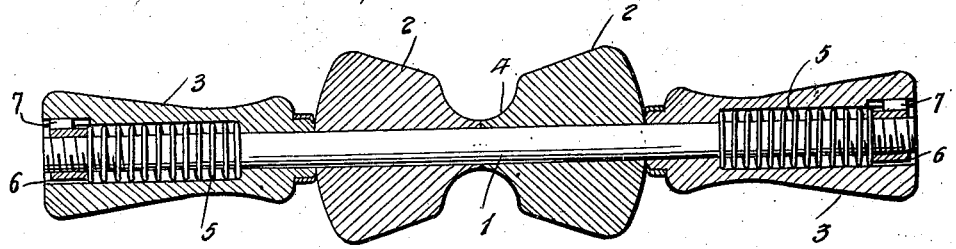
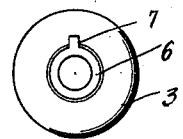
Inventor
J. Micali.
By
Attorney Patented Apr. 3, 1928.

1,665,172

UNITED STATES PATENT OFFICE.

JOHN MICALI, OF LAWRENCE, MASSACHUSETTS.

SHANK-FORMING TOOL.

Application filed April 29, 1924. Serial No. 709,842.

This invention has relation to a tool for the use of cobblers whereby the shank of a shoe may be properly and expeditiously shaped, said tool operating on opposite edge portions of the shank at the same time and uniformly shaping the same, the tool being constructed to be moved over the shank in substantially the same manner as a rolling-pin.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a detail view showing the application of the invention,

Figure 2 is an enlarged sectional view of the tool, and

Figure 3 is an end view of the spindle and handle.

Corresponding and like parts are referred to in the following description and designated in the several views of the drawings by like reference characters.

The tool comprises a spindle 1, complemental shaping rolls 2 and handles 3. The shaping rolls 2 are oppositely tapered and loosely arranged upon the spindle 1 with their smaller ends facing and reduced as indicated at 4. The handles 3 slidably engage opposite ends of the spindle 1 and are adjustable and pressed inwardly by helical springs 5 which are disposed within the handles and adapted to have their tension regulated by set nuts 6 threaded upon the outer ends of the spindle 1. A feather and spline connection 7 between each of the nuts 6 and handles 3 secures the handles on the spindle and retains the set nuts in the required adjusted position.

The shoe 8 required to have its shank shaped is mounted upon a last and the tool is placed upon the shank portion of the sole and rolled thereover forwardly and backwardly, the handles 3 being grasped in the hands and pressure exerted to shape or deflect marginal edge portions of the shank, as will be readily understood.

What is claimed is:

1. A tool for forming the shanks of shoes comprising a spindle, a pair of rolls mounted thereon having shank-forming surfaces and adapted for separating movement thereon, handles movable axially of the spindle to control the separating movement of the rolls, expansive springs within said handles abutting the handles, securing means threadedly engaging the spindle and abutted by said springs, interengaging means between said securing means and said handles, said springs serving to urge said rolls toward each other, and the tension of said springs being adjustable by rotating the handles relatively to the spindles.

2. A tool for forming the shanks of shoes comprising a spindle, a pair of rolls mounted thereon and arranged for relative axial movement, hollow handles on the spindle arranged for engaging the opposite ends of said rolls, springs within the handles, adjusting nuts threaded onto the ends of the spindle and engaging said springs, and spline and feather connections between said handles and the adjusting nuts permitting adjustment of the tension of the springs by relative rotation of the handles and spindle.

In testimony whereof I affix my signature.

JOHN MICALI.